G. ONEAL.
ANIMAL TRAP.
APPLICATION FILED APR. 29, 1910.
982,157.
Patented Jan. 17, 1911.
Fig. 1.
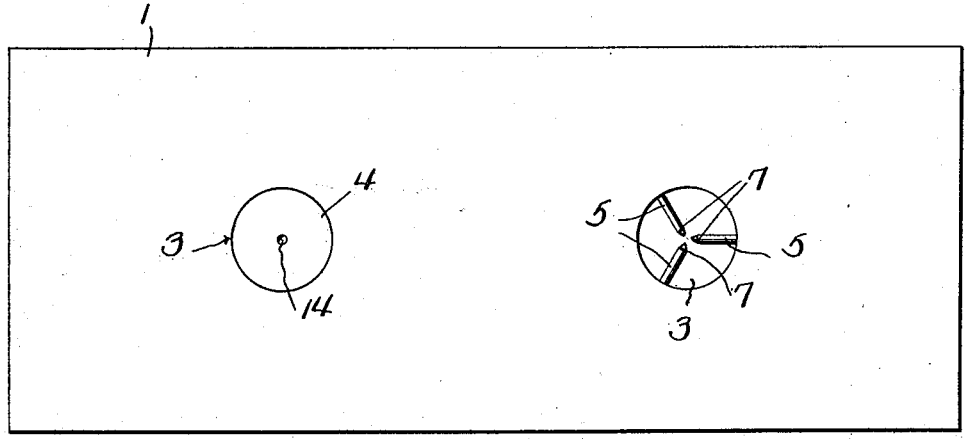
Fig. 2.
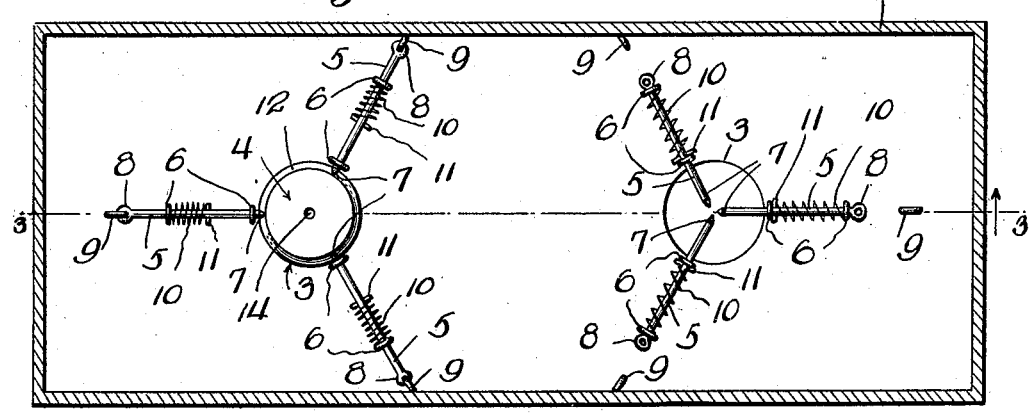
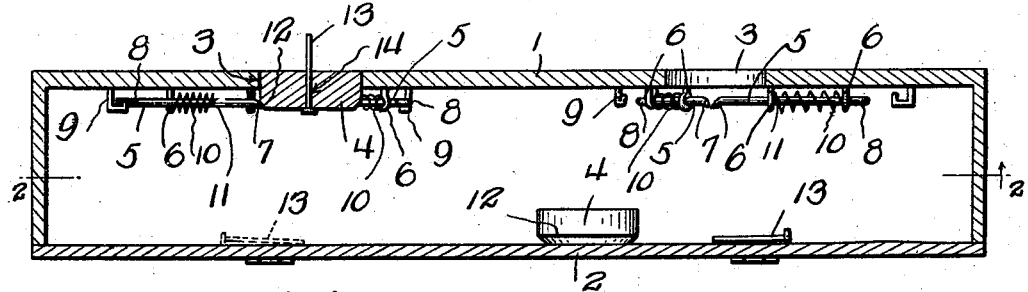
Fig. 3.
Witnesses
G. L. Kautz
Chas. C. Richardson,
Inventor
Glen Oneal,
By Victor J. Evans
Attorney
THE NORRIS PETERS CO., WASHINGTON, D. C.

UNITED STATES PATENT OFFICE.

GLEN ONEAL, OF JACKSON, MONTANA.

ANIMAL-TRAP.

982,157.  Specification of Letters Patent.  Patented Jan. 17, 1911.

Application filed April 29, 1910. Serial No. 558,380.

*To all whom it may concern:*

Be it known that I, GLEN ONEAL, a citizen of the United States, residing at Jackson, in the county of Beaverhead and State of Montana, have invented new and useful Improvements in Animal-Traps, of which the following is a specification.

This invention relates to new and useful improvements in animal traps and has for an object to provide a trap having all of the operating mechanism concealed so that it will cause no suspicion to the most wary of animals.

Another object is to construct a trap which is adapted to be completely covered with leaves, sand or the like without blocking or in any way hindering the ready tripping of the same.

A further object is to produce a trap having tangs for the purpose of pinioning the foot of an animal in a manner eliminating the risk of its either withdrawing the foot from the trap or reaching it with his mouth and gnawing loose.

A still further object of this invention is to create an animal trap comprising comparatively few parts and those so simple in construction that they can be manufactured at a minimum cost.

With these and other objects in view which will be disclosed as the description proceeds, this invention consists in certain novel formations and arrangements of parts which will be hereinafter more fully described, claimed and illustrated in the accompanying drawings, in which:

Figure 1 is a top plan view of my invention. Fig. 2 is a section on the line 2—2 of Fig. 3. Fig. 3 is a section taken on the line 3—3 of Fig. 2.

Referring to the drawing by characters of reference, the numeral 1 designates a housing having a hinged bottom 2 and apertures 3 formed in its upper wall for the reception of depressible blocks 4, the upper faces of which lie flush with the top of the housing.

Radial tangs 5 are mounted in suitable guides 6 upon the under side of the top of the housing and terminate inwardly in downwardly extending points 7. The opposite ends of the tangs are provided with eyes 8 for the reception of the upturned ends of hooks 9, which are carried by the housing. Helical tension springs 10 surround the tangs 5 and bear against the outer guides 6 and pins 11 formed on the intermediate portions of the said tangs 5 and tend to normally press the same inwardly to a common center under the openings 3 of the housing 1.

When the trap is set, the points 7 of the tangs 5 extend slightly under the apertures 3 so that the beveled lower faces 12 of the depressible trip members 4 may rest thereon without falling into the housing. When the trap is set, the tangs 5 are retracted against the tension of the springs 10 until the eyes 8 engage the upturned ends of the hooks 9. The depressible members 4 are then placed in the apertures 3 by means of headed setting pins 13 which are adapted to be inserted through apertures 14 formed centrally of the said depressible blocks. After the depressible members are seated in their normal position upon the downwardly extending points 7 of the tangs 5, the setting pins 13 may be permitted to drop down into the housing and out of the way until when needed again for resetting.

It should be noted that the front members of the fastenings 6 which retain the tangs 5 upon the underside of the top of the housing 1 are in the form of eyes adapted to engage the tangs while the rear members are in the form of U-shaped staples. It is manifest that any slight pressure upon the blocks 4 forces the eyes 8 of the tangs inward through the medium of the beveled faces 12 of the said blocks and downward extending points 7 of the tangs 5 and upward, in which movement the forward members of the fastenings 6 act as fulcrums for the tangs and the rear members as guides, until the said eyes 8 are released from the pins 9. The blocks 4 then fall into the housing and the tangs 5 spring to the center of the apertures under the pressure of the helical tension springs 10 and pinion the foot of the animal stepping upon the depressible member. As the end of the tangs are curved downward any attempt by the animal to withdraw its foot will be of no avail.

Having thus fully described my invention what I claim as new is:

1. In an animal trap, a housing having openings formed in its face, depressible blocks normally seated in the said openings, tangs mounted within the housing upon which the blocks rest, and springs upon the tangs adapted to force them toward the openings upon the depression of the blocks.

2. In an animal trap, a housing having openings in its upper face and a hinged bottom to admit access to the housing, depressible blocks provided with lower beveled faces seated normally in the openings, radial tangs slidably mounted within the housing, helical springs upon the tangs adapted to force them to the center of the openings, eyes formed upon the outer ends of the tangs, hooks mounted in the casing for the purpose of engaging the eyes until the depression of the blocks.

3. In an animal trap, a housing having openings in its upper face and a hinged bottom to admit access to the housing, radial tangs having downwardly extending pointed inner ends slidably mounted within the housing, helical springs surrounding the tangs and adapted to force them to the center of the openings, eyes formed upon the outer ends of the tangs, hooks mounted within the housing and adapted to engage the eyes of the tangs, and depressible blocks seated normally in the openings and provided with a lower beveled face engaging the inner ends of the tangs and adapted to force the eyes outward and upward from engagement with the hooks.

4. In combination with a housing having a hinged bottom and apertures in its upper face, radial tangs mounted within the housing, springs for forcing the tangs to the center of the openings, eyes formed upon the outer ends of the tangs, hooks carried by the housing and adapted to engage the eyes of the tangs, and depressible blocks seated in the openings formed in the housing, and constituting means for releasing the eyes from the pins upon the depression of the blocks.

In testimony whereof I affixed my signature in presence of two witnesses.

GLEN ONEAL.

Witnesses:
R. W. BOONE,
W. S. BAYERD.